(12) United States Patent
Tiefenbrunn

(10) Patent No.: US 9,625,790 B2
(45) Date of Patent: Apr. 18, 2017

(54) SUPPORT BASE FOR PHOTOGRAPHIC APPARATUS

(71) Applicant: Larry J. Tiefenbrunn, Edison, NJ (US)

(72) Inventor: Larry J. Tiefenbrunn, Edison, NJ (US)

( * ) Notice: Subject to any disclaimer, the term of this patent is extended or adjusted under 35 U.S.C. 154(b) by 0 days.

(21) Appl. No.: 14/866,956

(22) Filed: Sep. 26, 2015

(65) Prior Publication Data

US 2016/0091780 A1   Mar. 31, 2016

Related U.S. Application Data

(60) Provisional application No. 62/056,604, filed on Sep. 28, 2014, provisional application No. 62/089,616, filed on Dec. 9, 2014.

(51) Int. Cl.
   *G03B 17/56* (2006.01)
   *F16M 13/02* (2006.01)
   *F16M 11/24* (2006.01)

(52) U.S. Cl.
   CPC ........... *G03B 17/561* (2013.01); *F16M 11/24* (2013.01); *F16M 13/02* (2013.01)

(58) Field of Classification Search
   None
   See application file for complete search history.

(56) References Cited

U.S. PATENT DOCUMENTS

| | | | | |
|---|---|---|---|---|
| 3,704,848 A | * | 12/1972 | Trebes | F16M 11/04 248/163.1 |
| 4,570,887 A | * | 2/1986 | Banister | F16M 11/02 248/187.1 |
| 6,979,240 B1 | * | 12/2005 | Barton | B63H 20/007 297/423.46 |
| 8,827,575 B1 | * | 9/2014 | Caldeira | G03B 17/561 396/29 |
| 2004/0146293 A1 | * | 7/2004 | DeSorbo | F16M 11/04 396/428 |
| 2005/0265711 A1 | * | 12/2005 | Heibel | B60R 11/04 396/419 |
| 2006/0197001 A1 | * | 9/2006 | Parker | F16M 13/02 248/230.8 |
| 2008/0102001 A1 | * | 5/2008 | Chandrachood | H01J 37/32935 422/129 |
| 2013/0101280 A1 | * | 4/2013 | Xu | G03B 17/566 396/423 |

(Continued)

*Primary Examiner* — W B Perkey
(74) *Attorney, Agent, or Firm* — Henry I. Schanzer, Esq.

(57) ABSTRACT

An essentially flat support base plate for mounting a piece of photographic equipment such as a photographic tripod head (camera mount) or camera. A preferred embodiment includes an aluminum base plate assembly formed with at least one threaded stud which is sized to fit into corresponding holes in selected pieces of photographic equipment. The stud is made of a non-ferrous material, such as titanium, to enable the plate and stud to be black anodized. The threaded stud is preferably welded in place to ensure that the stud is firmly and permanently attached to the base plate and cannot rotate independently of the plate. A base plate so formed has an elegant and aesthetically pleasing appearance and the base plate can be attached to or detached from any selected piece of equipment plate without the use of any tools (i.e., to make it tool free).

15 Claims, 16 Drawing Sheets

(56) References Cited

U.S. PATENT DOCUMENTS

| | | | |
|---|---|---|---|
| 2014/0033496 A1* | 2/2014 | Lettkeman | F16M 13/02 29/428 |
| 2014/0130332 A1* | 5/2014 | Partridge | H02G 13/00 29/525.01 |
| 2016/0091780 A1* | 3/2016 | Tiefenbrunn | G03B 17/561 396/419 |
| 2016/0160532 A1* | 6/2016 | Patino | E05B 65/006 70/167 |

* cited by examiner

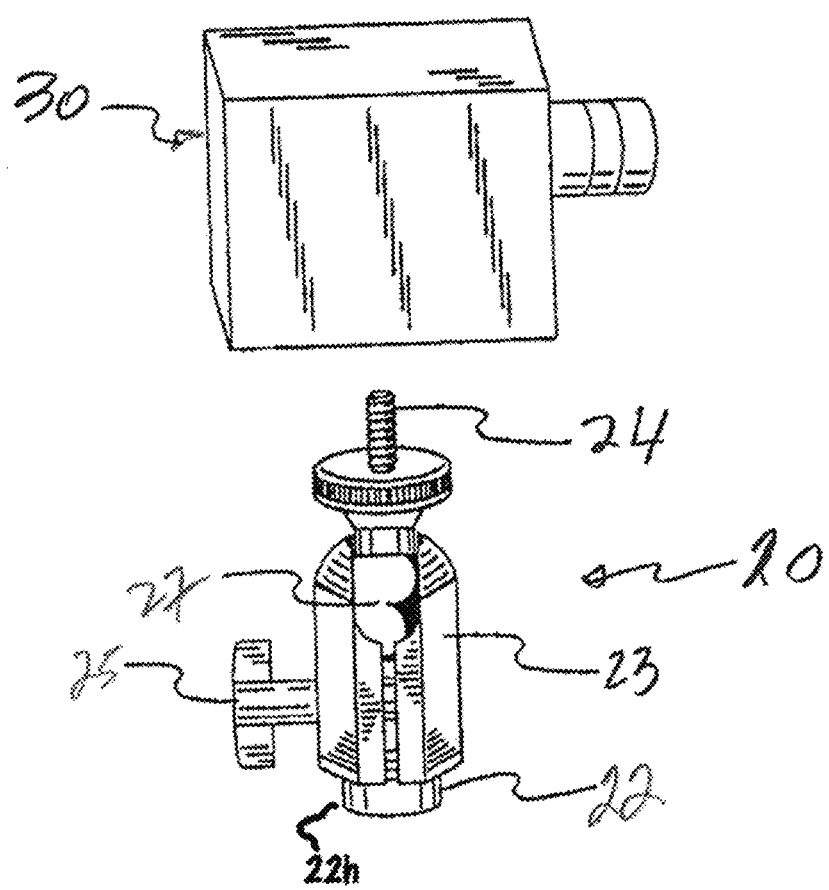
FIG 1A - Prior Art

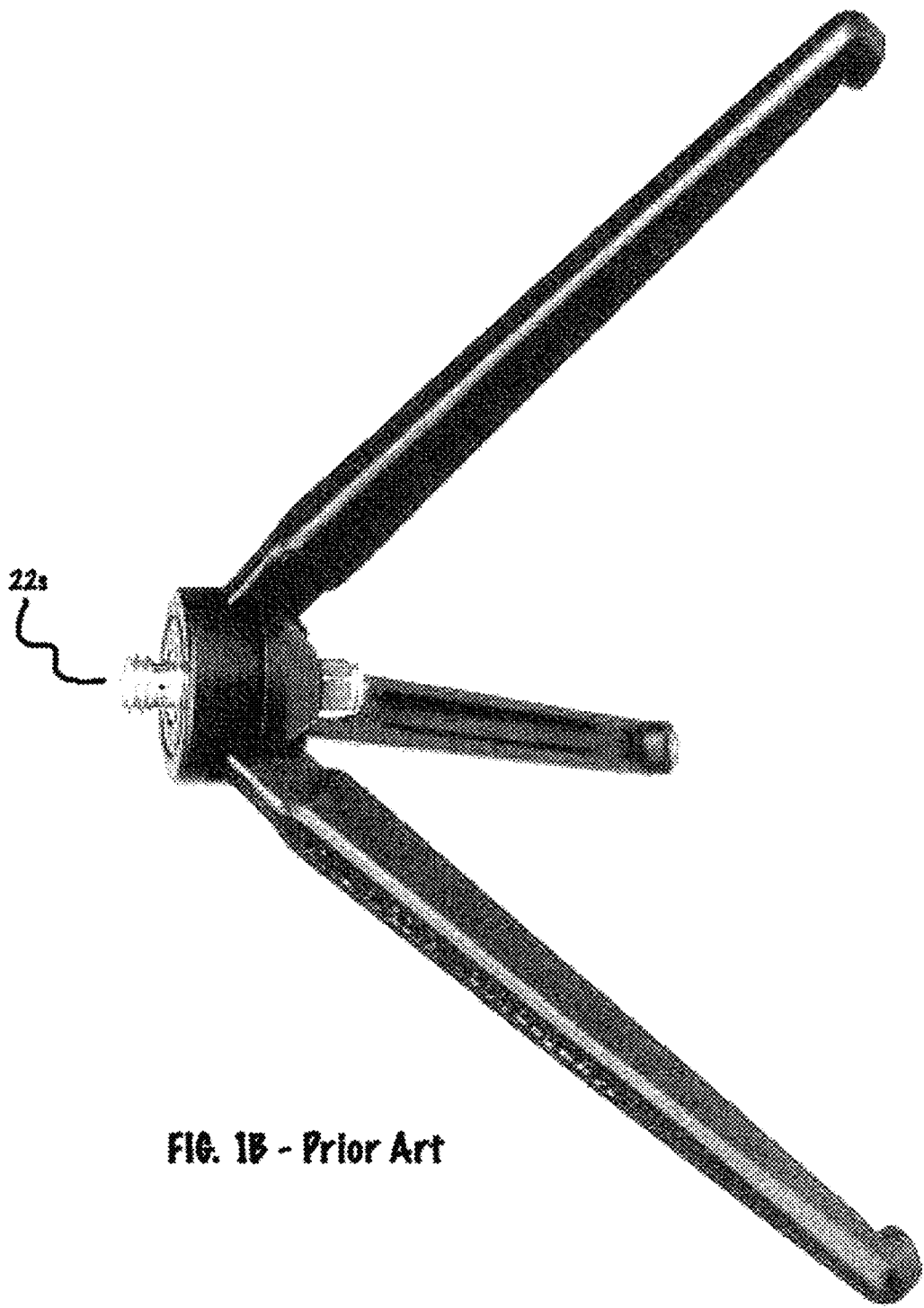
FIG. 1B - Prior Art

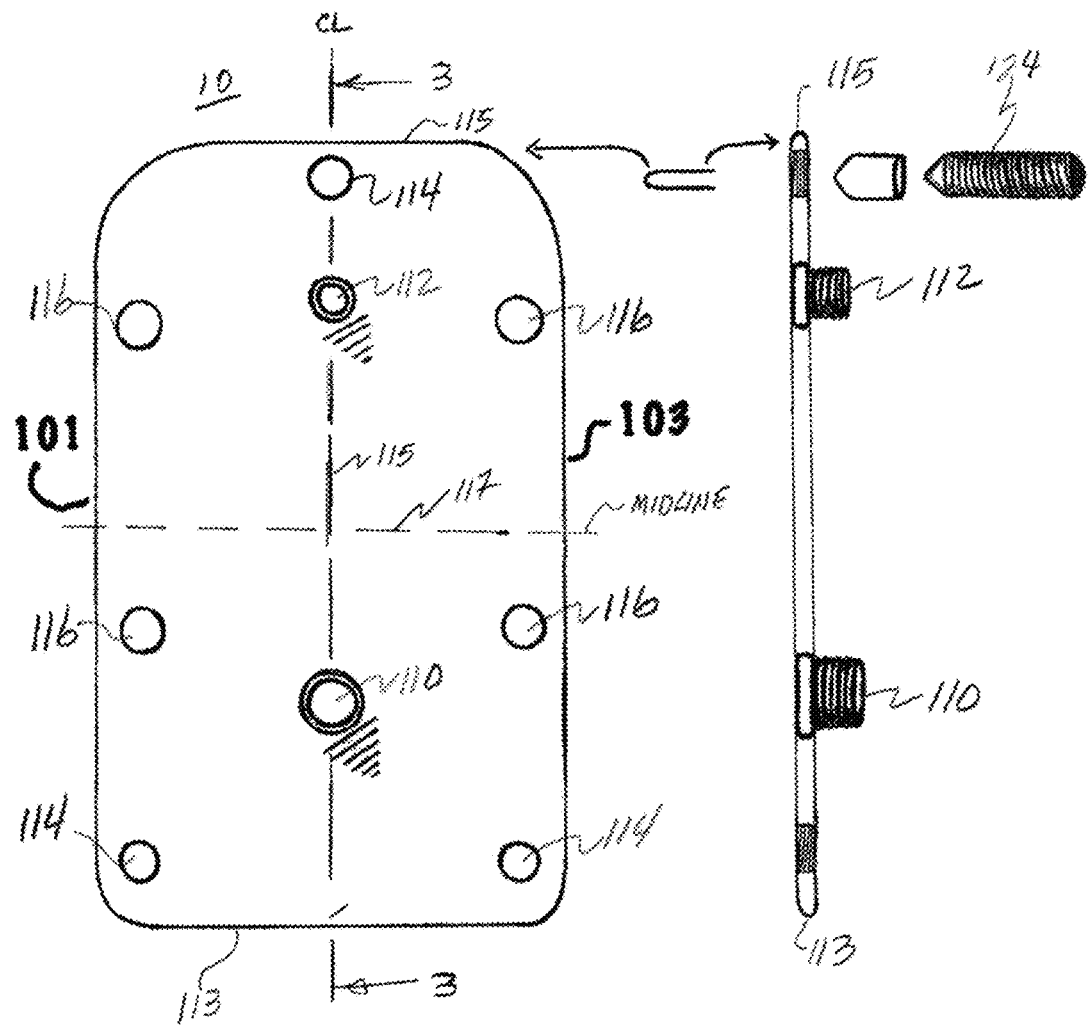

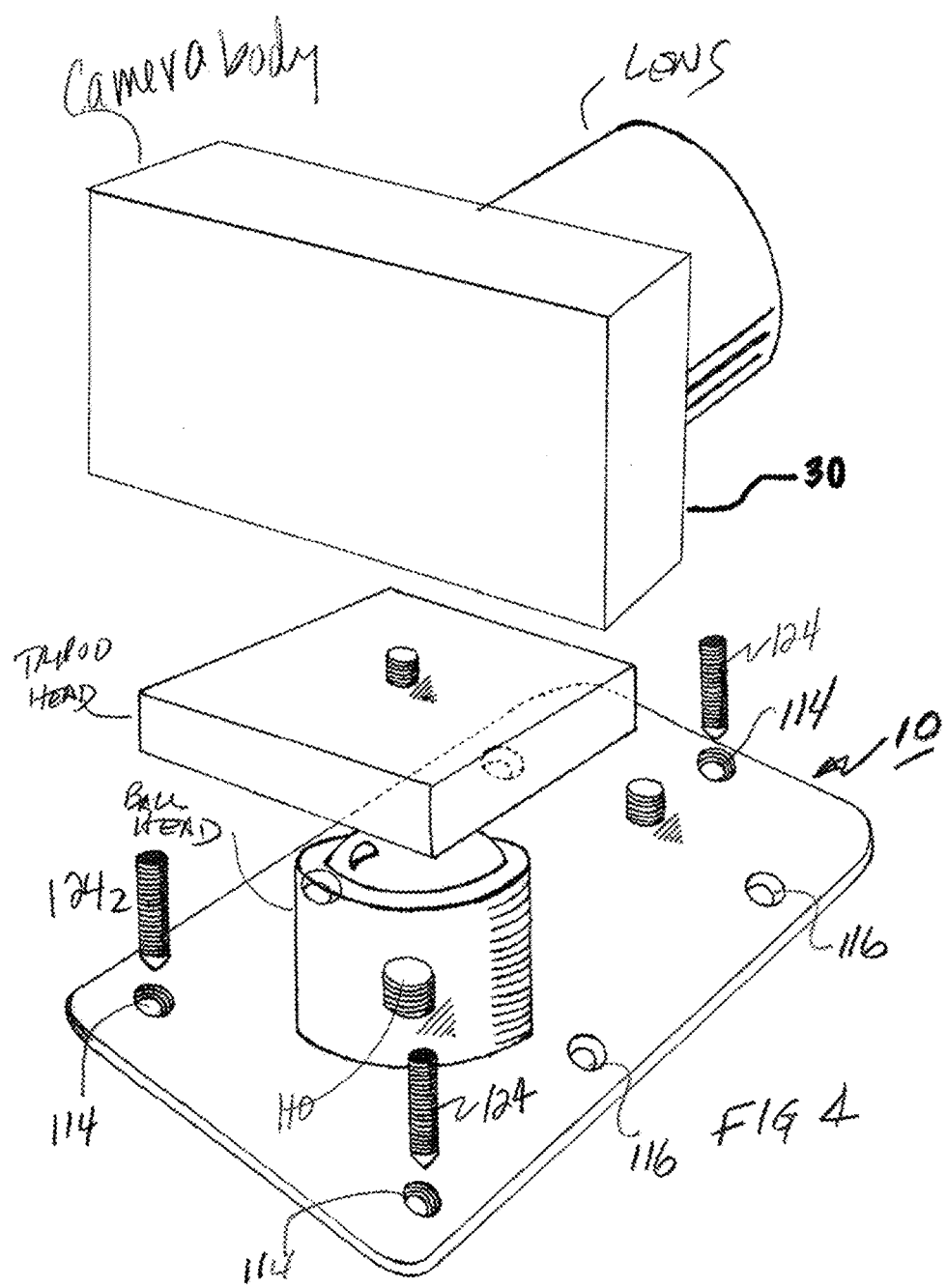

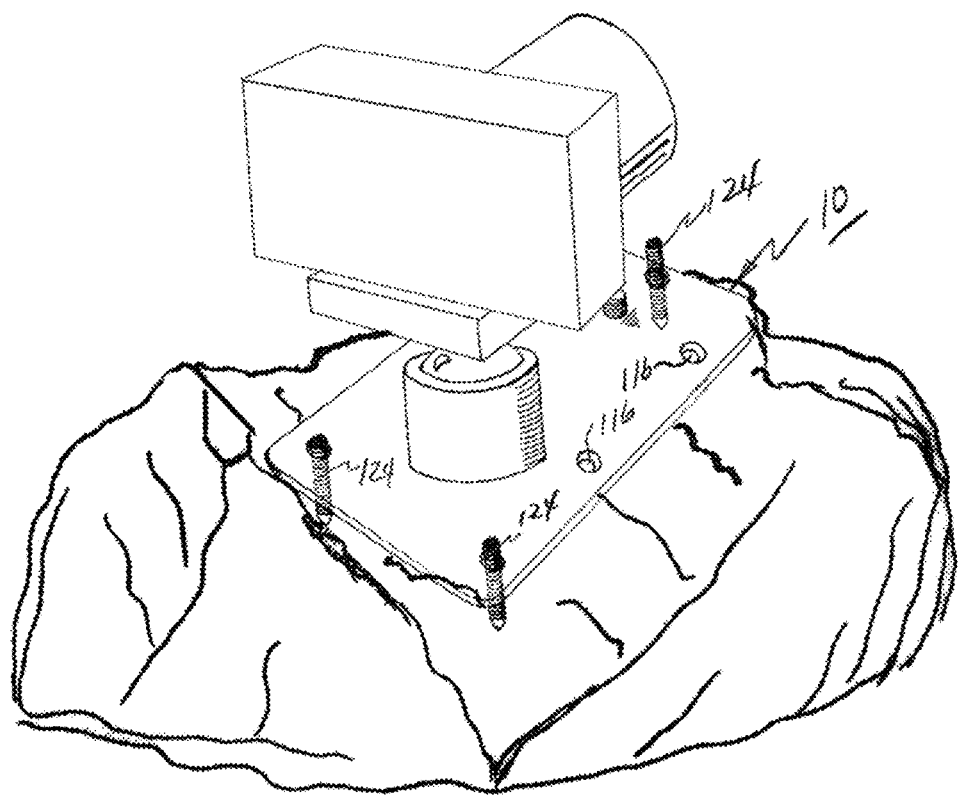
FIG. 5

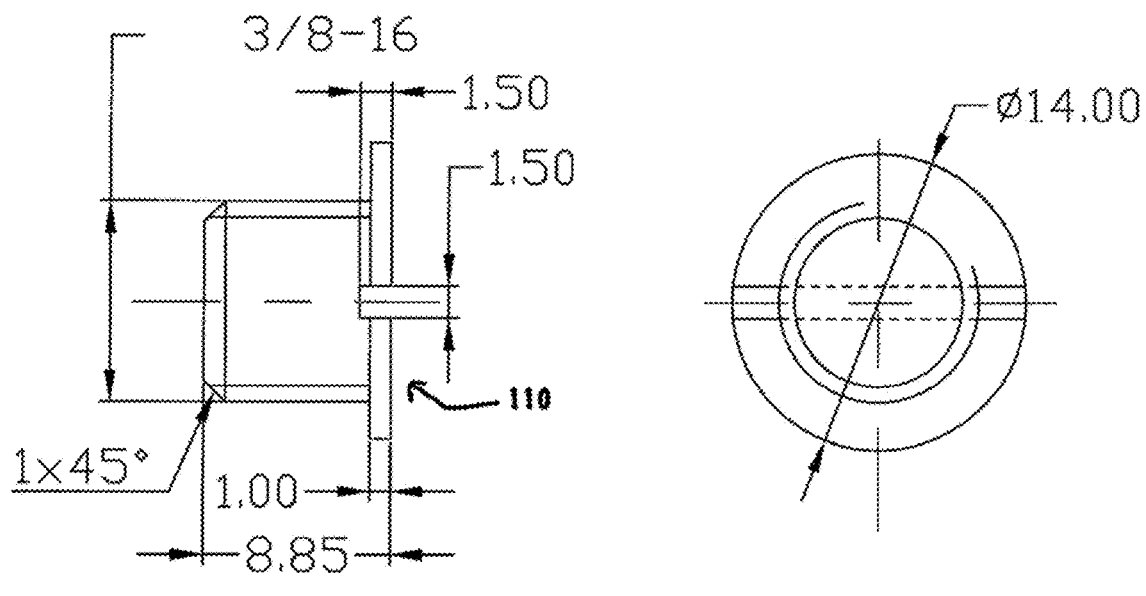
Construction of Titanium bolts
(3/8"-16 thread above, 1/4"-20 thread below)
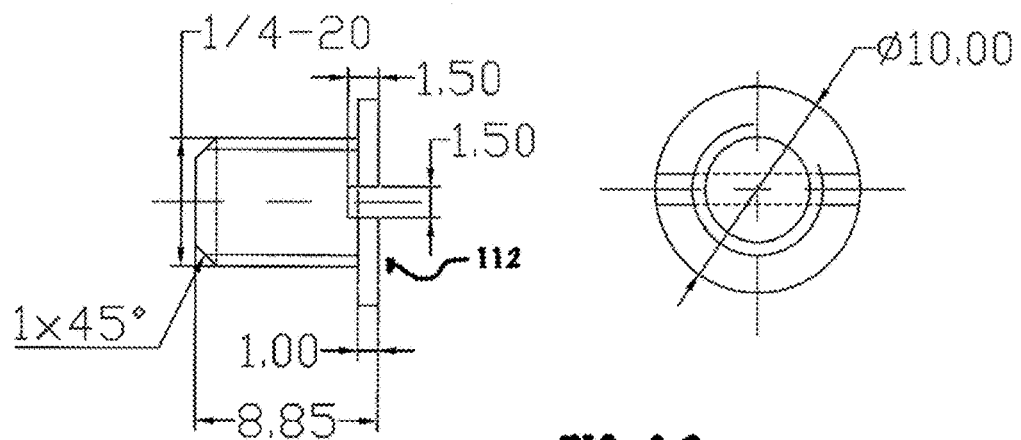
FIG. 12

Notes:
1. Protect the thread when sand surface
2. Weld should be smooth
3. Surface: Sand blast and anodize

SUPPORT BASE FOR PHOTOGRAPHIC APPARATUS

This application claims priority based on a provisional application titled Camera Mount Base bearing Ser. No. 62/056,604 filed Sep. 28, 2014 whose teachings are incorporated herein by reference. This application also claims priority based on a provisional application titled Improved Camera Mount Base bearing Ser. No. 62/089,616 filed Dec. 9, 2014 whose teachings are incorporated herein by reference.

BACKGROUND OF THE INVENTION

This invention relates to a support base plate for preferably mounting thereon photographic equipment such as a photographic tripod head (also referred to herein as a "camera mount"), a camera, or any other suitable piece of equipment.

Almost every professional and many amateur photographers own tripods which function as bases to hold or support a tripod head (camera mount) designed to hold and level a camera mounted thereon. FIG. 1A shows a camera mount 20 designed to support a camera 30 and to adjust the camera's position and leveling (via elements 23, 25, 27). Camera mounts normally have a screw hole 22h centered in their bottom screw head 22 and a threaded stud (bolt) 24 extending from the top of the camera mount. The camera mount's stud 24 is intended to be screwed into the bottom of a camera 30 having a corresponding sized screw hole (not shown). The camera mount's screw hole 22h, which may be any suitable size (e.g., typically ⅜ inches), is intended to be attached to a correspondingly sized stud 22s extending from a tripod (see FIG. 1B) or any suitable base. Camera mounts are available in many different sizes, styles and configurations and may be purchased separately without a tripod. Likewise, tripods built to support a camera mount are also available in many different sizes styles and configurations. For ultimate portability there are many styles of tabletop tripods. The one shown in FIG. 1B being an illustrative example. Known compact tripods to support a camera or camera mount are built to support miniature cameras. However, tripods designed to support a large, relatively heavy, camera of the type used by professionals are bulky and heavy. It is therefore desirable to find a substitute or replacement for the standard tripod.

A problem faced by applicant was how to provide a stable and secure support base for a camera mount (tripod head) intended to support a relatively heavy camera with a telescopic lens attached which is so weighted to one side that the camera tends to tip over. An additional problem was the need to have a support base which would enable a camera mount attached to a camera to be securely placed on a table or on the floor, or mounted on a wall. Also needed was base plate which would include means for leveling the plate and which could provide gripping for hard surfaces such as, among others, rocks and concrete ledges. A still further problem was the need to have a support base which would be relatively light, and not bulky, and which could be attached to a piece of equipment and/or detached therefrom easily and without additional tools. That is, a major goal in designing a camera mount base embodying the invention was to make it possible to assemble (or disassemble) the camera mount base with selected camera components without the use of any tools (i.e., to make it tool free).

SUMMARY OF THE INVENTION

In accordance with the invention, there is provided an essentially flat support base plate for mounting a piece of photographic equipment such as, for example, a photographic tripod head (camera mount). The base plate is suitable for use with a professional camera; but any tripod head and camera may be mounted thereon. Although primarily intended to support photographic equipment the base plate of the invention may be used as a support base for any suitable piece of equipment. Although simple in design, the novel base plate (which may be referred to as Platypod Pro™) offers the most flat, compact, lightweight and sturdy support for a tripod head available today.

The base plate may be formed of any non-ferrous material which is light in weight and sturdy enough to support an intended piece of equipment. A preferred embodiment includes an aluminum base plate assembly preferably formed with threaded studs made of titanium or any non-ferrous material having like properties. The use of such non-ferrous metals allows the aluminum base plate and the studs to be black anodized. This feature provides an elegant and aesthetically pleasing support base plate. The threaded studs are preferably firmly and permanently attached (e.g., welded) to the base plate to ensure that the studs cannot rotate independently of the plate. This feature ensures that the base can be attached to or detached from any selected piece of equipment plate without the use of any tools (i.e., to make it tool free). Base plates embodying the invention may also include leveling means for controlling the leveling of the plate. The base plates may also include securing means for selectively attaching the base plate to a surface.

BRIEF DESCRIPTION OF THE DRAWINGS

In the accompanying drawings, which are not all drawn to scale, like reference characters denote like components; and FIG. 1A is an isometric drawing of a camera and camera mount which can be mounted on a base plate embodying the invention;

FIG. 1B is an image of a prior art tripod intended to support a camera mount and camera;

FIG. 2 is a top view of the base plate of FIG. 1;

FIG. 3 is a cross sectional diagram of the base plate of FIGS. 1 and 2;

FIG. 4 is a highly simplified isometric view showing a camera mounted on a tripod/ball head which is mounted on a base plate embodying the invention;

FIG. 5 is a highly simplified isometric view showing a camera mounted on a tripod/ball head which is mounted on a base plate embodying the invention being balanced on an uneven surface;

FIG. 12 is a drawing of the construction of studs 110 and 112 to be attached to the base plate of FIG. 8;

DETAILED DESCRIPTION OF THE INVENTION

Figure 1:
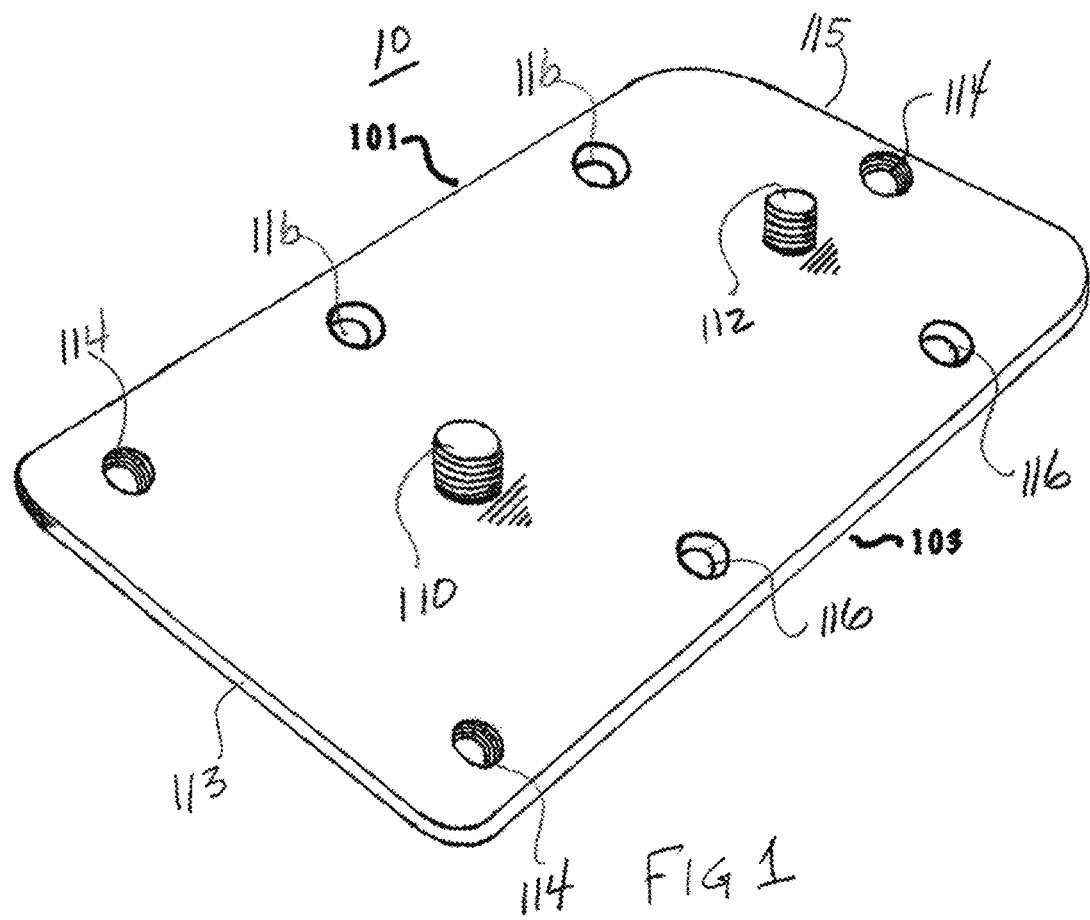
FIG. 1 is an isometric drawing of a base plate embodying the invention.

Referring to FIGS. 1, 2 and 3, there is shown a support base plate 10 embodying the invention which was designed for the mounting thereon of photographic equipment such as a camera mount and/or a camera. However, it should be understood that a support base plate embodying the invention may be used to support any suitable piece of equipment.

In one embodiment, the base plate 10 was made to be approximately 3 inches in width, 5 inches in length and 4 millimeters thick. These dimensions are given for purpose of example only; the width, length and thickness of base plates 10 embodying the invention may be significantly greater or less than these dimensions. The base plate material may be aircraft grade aluminum or any other suitable material. The limitation on the base plate material is that it be relatively light in weight, sturdy and for enabling studs (bolts) to be firmly and permanently attached. Any non-ferrous material including carbon fibers may be used to form the plate. The entire outer rim of the plate 10 is routed and rounded. This enables the plate to be placed in any pocket without cutting into the pocket due to sharp edges. For aesthetics, the plate may be black anodized with a white, laser etched, design elements. Alternatively the design may be embossed on the plate.

Referring to FIGS. 1, 2 and 3 there is shown a threaded screw stud 110 firmly and permanently attached to the plate. In the embodiment the stud 110 was bolted and welded to (and/or through) the plate 10. Looking down at the figures, the plate 10 has a bottom end 113 and a top end 115 and it has a left end side 101 and a right end side 103. There is a center line 11c extending the length of the plate between the left and right end sides. There is a midline 117 extending midway between the top 115 and bottom 113 ends. Stud 110 is located (centered) along the vertical center line 11c of the plate and below the midline 117 of the plate. So positioned, stud 110 is nearer to the bottom end 113 of the plate (as shown in the figures). The stud 110 is located below the midline 117 to compensate for the asymmetrical weight distribution due to the camera and its lens which are designed to be mounted on the plate. Thus, for a plate which is 5 inches long, the stud 110 may be located ½ inch to 2 inches below the midline 117 of the plate. In one embodiment the threaded stud (bolt) 110 was a standard stainless steel stud that can mount into almost any professional tripod head (e.g., a standard ⅜" diameter by ¼" long bolt). Another stud (bolt) 112 is also shown bolted through the plate. Stud 112 may be a standard ¼" diameter by ¼" long stainless steel stud to allow attachment of smaller consumer style heads or other accessory items.

Three "leveling" holes (114), defining a triangular plane, are formed in the plate to enable the insertion of screws or spikes 124 (as shown in FIG. 4) which would be used to level the plate 10 when placed on an uneven surface such as a boulder as shown in FIG. 5. The holes 114 may be, for example, ¼" threaded holes.

Figure 6:
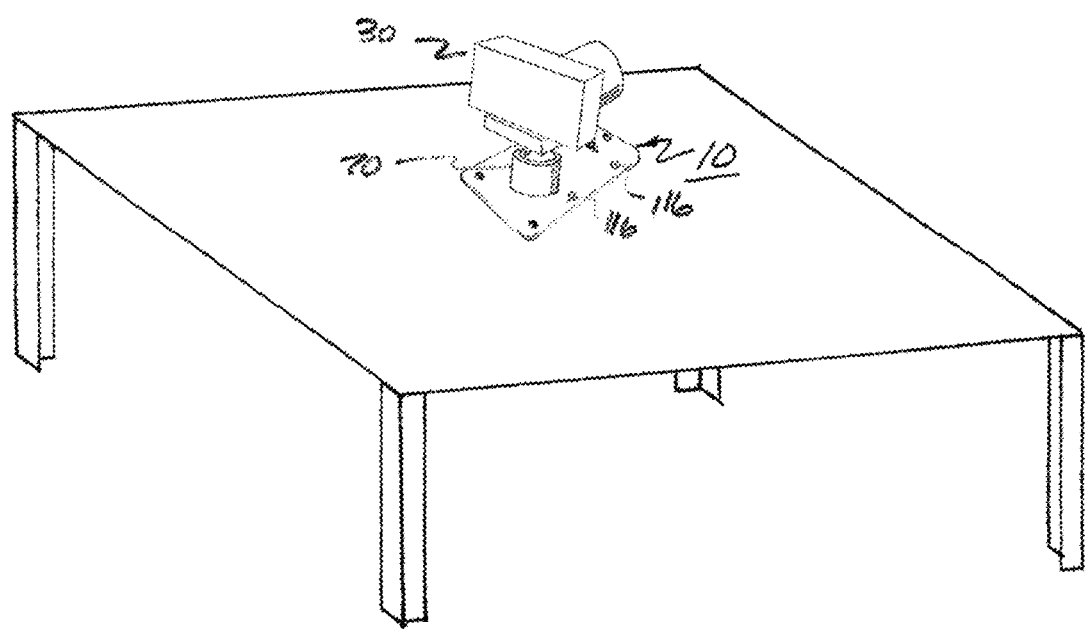
FIG. 6 is a highly simplified isometric diagram showing a camera mounted on a tripod head which is mounted on a base plate embodying the invention resting securely on a table top.

Also shown in the figures are four "securing" holes (116) to enable the plate to be nailed or screwed into a surface such as a table top (as shown in FIG. 6), or onto a wall or ceiling beam or spiked into the ground. The holes 116 may be unthreaded and may be, for example, 9/32 of an inch. The securing holes also permit straps and hooks to be passed through to enable the plate to be attached to an object or surface in many different ways.

Figure 9:
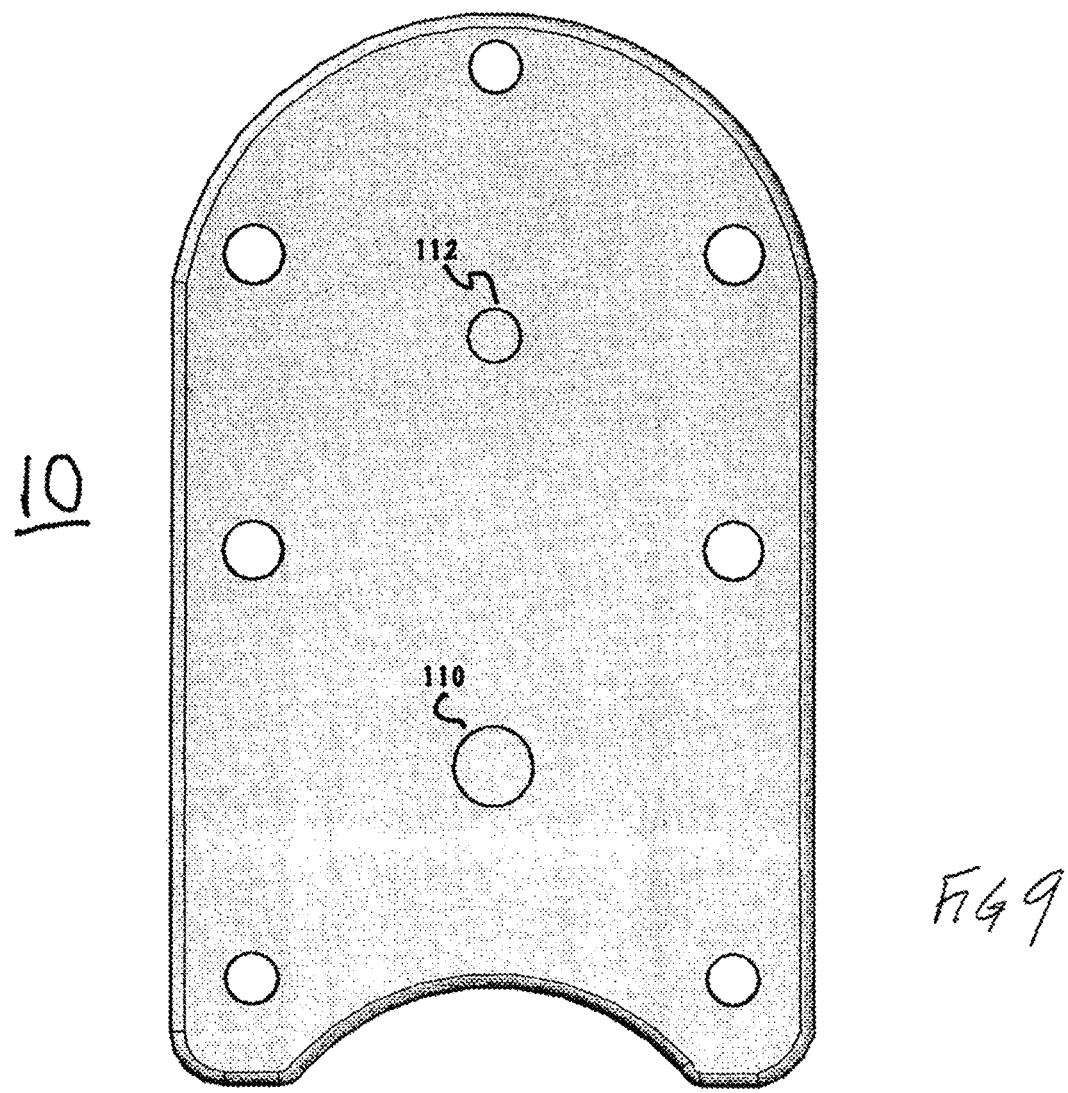
FIGS. 9 and 10 are bottom views of the base plate of FIG. 8.
Figure 10:
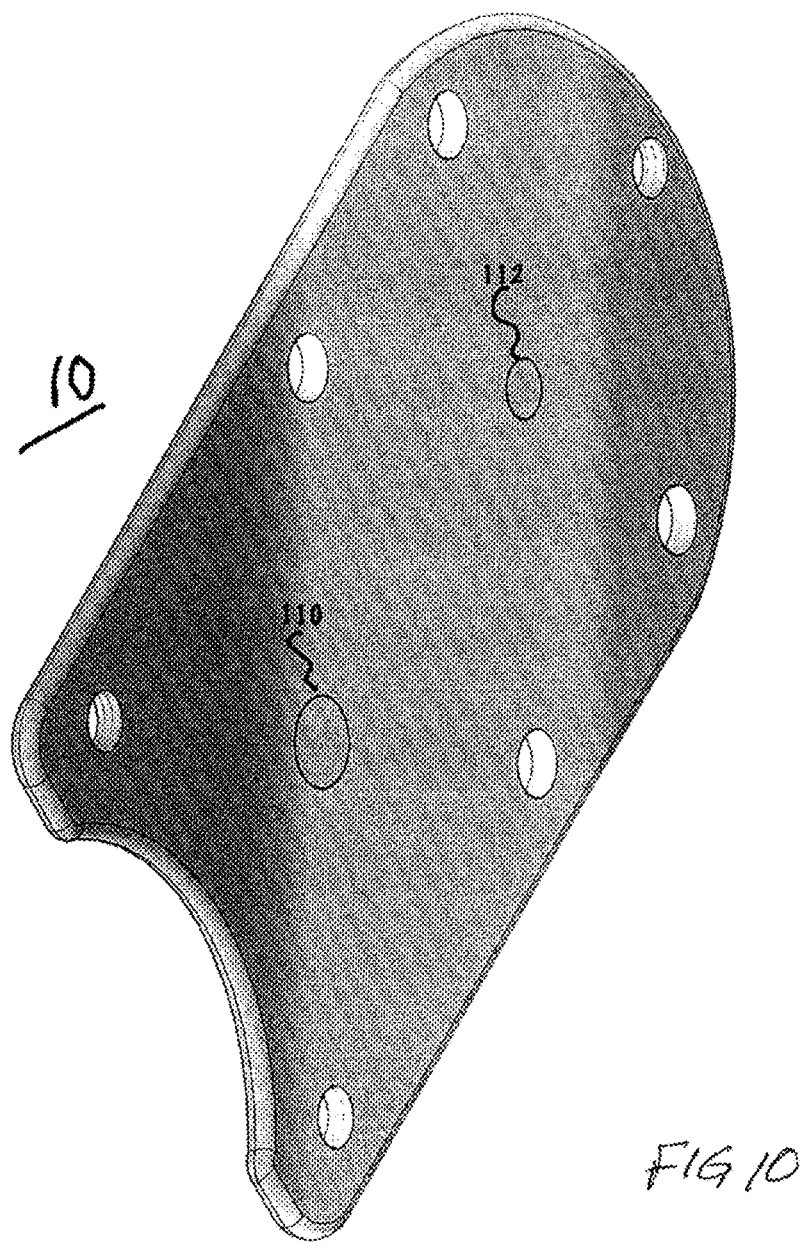

The two studs 110 and 112 are permanently and firmly attached to the plate (see FIGS. 9 and 10). For example, they can be bolted or welded and countersunk in with completely flat and smooth under-surfaces. This allows a user to mount virtually any piece of equipment (e.g., a tripod head) having a screw hole sized to match the studs on base 10 by simply rotating the plate without any tools.

The plate 10 may be supplied as part of a kit which includes screws that fit into the 114 leveling holes and with screw/spikes that fit into the 116 securing holes. The screws may have a spike on one end and simple rounding on the other end. Small rubber caps may be supplied to cover the spike ends and may be placed on top of the spike-screws when the spikes are uncovered. The screws may be of metal (e.g., stainless steel) or plastic. On flat and level surfaces these screws may not be required.

FIG. 4 shows a camera mount (tripod head and ball head) capable of supporting the camera body with the camera mount sitting on a base plate 10. Note the "leveling" screw holes 114 and the leveling screw 124 which can adjust the height and the leveling of the plate.

FIG. 5 shows how the screws 124 may be adjusted to balance the base plate 10 on an uneven surface such as a rock.

FIG. 6 shows how the assembly (camera, camera mount and base plate) can be secured via screws/spikes fitted via holes 116 into, and/or onto, an underlying surface.

Figure 7:
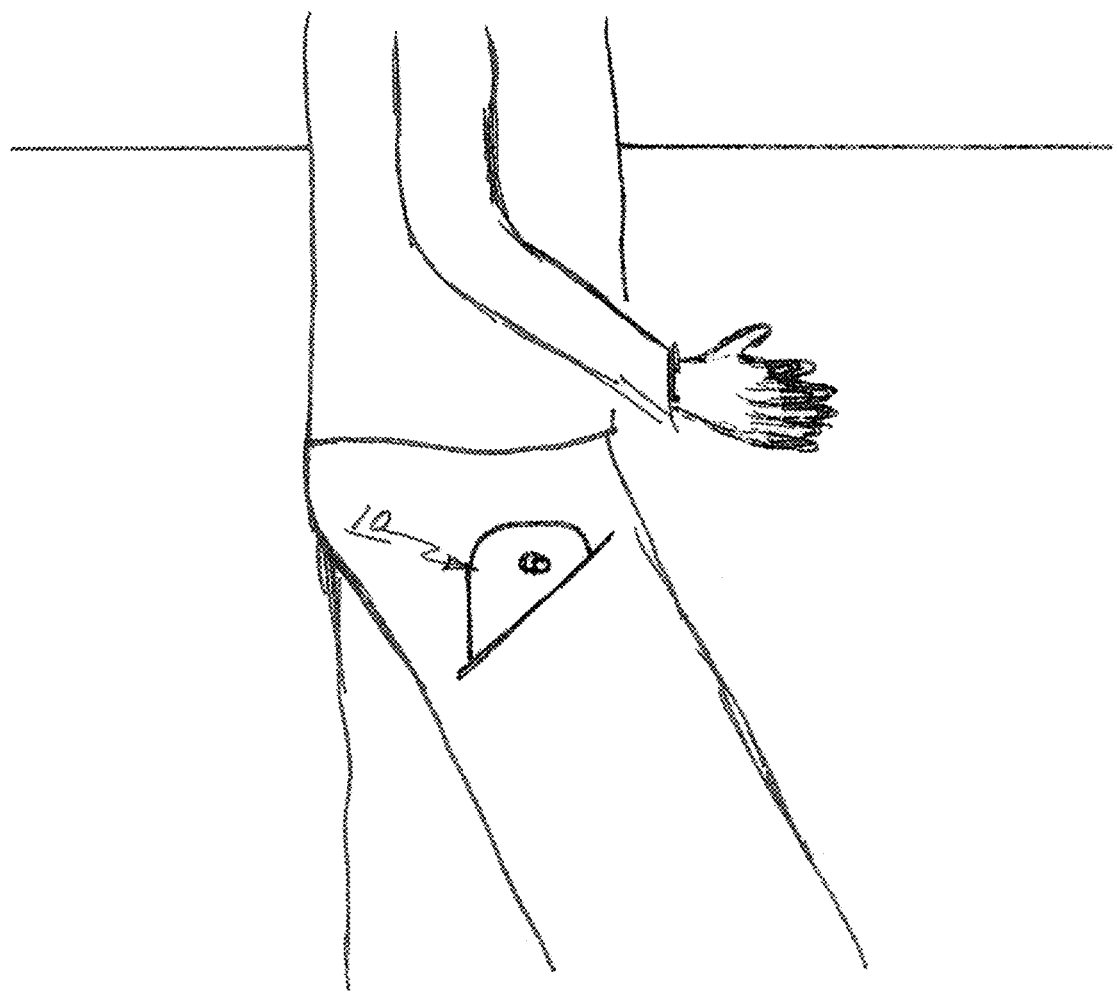
FIG. 7 is a diagram illustrating that a base plate embodying the invention can be easily carried in a pocket of a user.

FIG. 7 shows that a plate embodying the invention can be easily carried in a pocket of a user.

Figure 8:
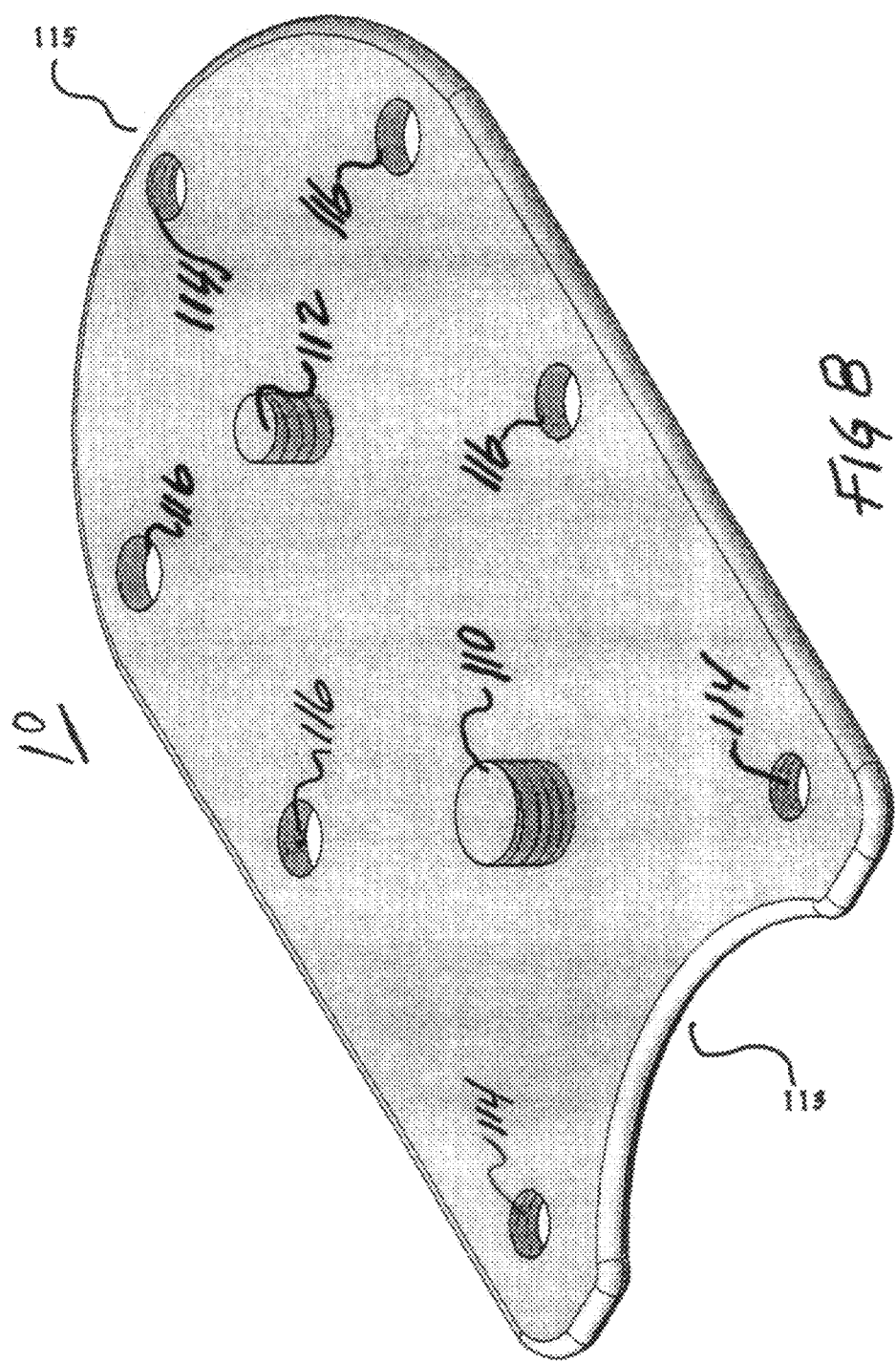
FIG. 8 is an isometric top view of an alternate base plate embodying the invention.
Figure 11:
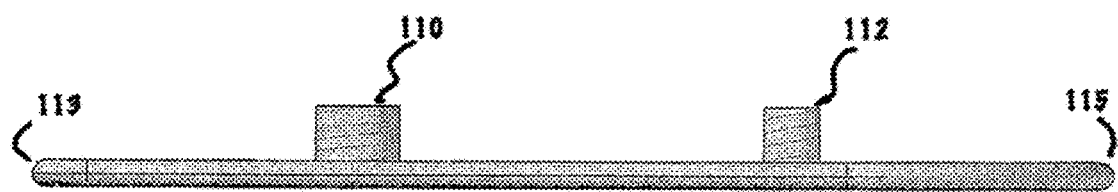
FIG. 11 is a cross-sectional view of the base plate of FIG. 8.
Figures 13A, 13B:
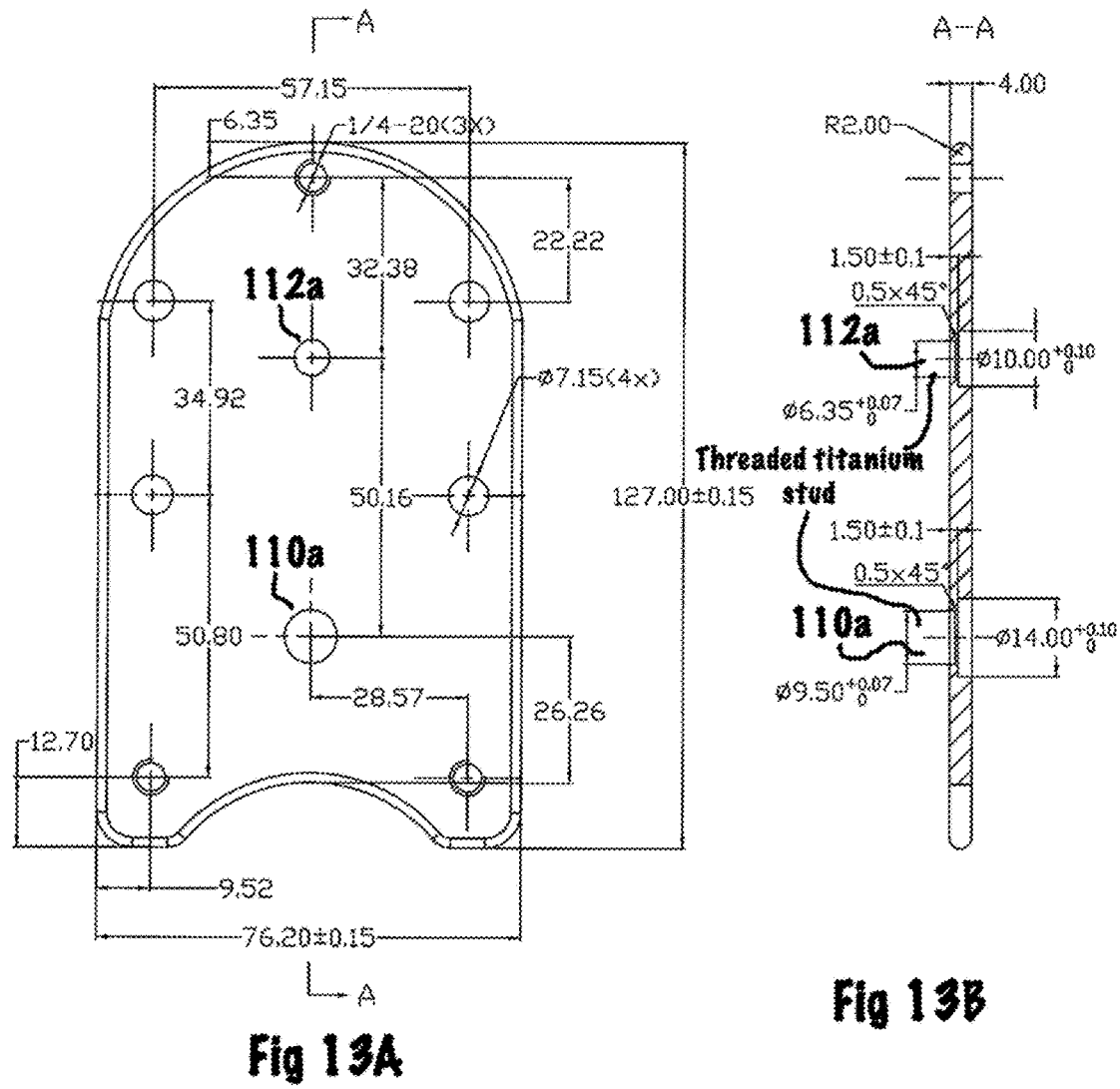
FIG. 13A is a top view of the holes formed in a base plate embodying the invention.
FIG. 13B is a cross sectional view of FIG. 13A showing the holes for studs 110 and 112.
Figure 14A:
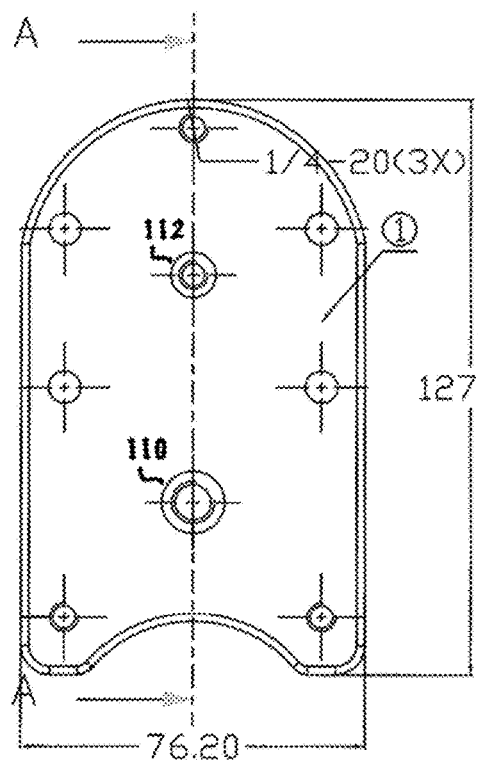
FIG. 14A is a top view of the plate of FIG. 13A with studs mounted therein.
Figure 14B:
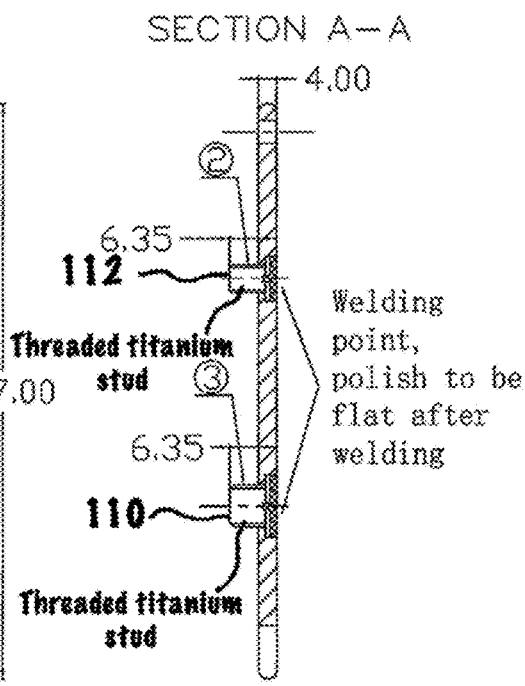
FIG. 14B is a cross sectional view of the base plate with two studs mounted thereon.

FIG. 8 shows a top view of a plate embodying the invention which is similar to the plates shown in the previous figures except that a portion of the bottom end 113 has been rounded (cut) out. FIGS. 9 and 10 are underside views and FIG. 11 is a cross-sectional view of the plate of FIG. 8. They are shown to emphasize that screws 110 and 112 are countersunk with no protrusion to ensure a very smooth underside area.

FIG. 12 is a drawing showing dimensions in millimeters of two studs 110 and 112 which are intended to be attached to the base plate. Note the studs (bolts) have a T-shape with the horizontal portion of the T to be fitted within the base plate 10.

In the discussion below reference will now be made to FIGS. 13A, 13B, 14A, 14B, where dimensions are given in millimeters. Applicant discovered that, when stainless steel studs (screws) 110 and 112 were inserted/mounted in an aluminum base plate 10 and the assembly underwent an anodizing process, the stainless steel studs (screws) appeared to have melted. This led to Applicant's discovery that the anodizing process used for aluminum corrodes and attacks any ferrous metal including stainless steel. To overcome this problem, an aluminum base plate assembly embodying the invention is preferably formed with threaded studs made of titanium or any non-ferrous material having like properties to titanium. The use of such non-ferrous metals allows the aluminum plate and the studs to be black anodized. It is noted that the plate may be treated during the anodizing step, or at any other suitable point in the process, to have colors other than black. It is also noted that the plate and studs may be formed using any materials which may be anodized such as, for example, aluminum, titanium, zinc, niobium, tantalum or alloys thereof.

As noted above, a major goal in the design of a support base plate 10 embodying the invention was to make it possible to assemble (or disassemble) the base plate with selected components (e.g., selected pieces of photographic equipment) without the use of any tools (i.e., to make it tool free). This requires a welded assembly of the two main threaded bolts or studs 110, 112. The studs (110, 112) have to be locked in place so they do not rotate when mounting a selected object on the aluminum plate 10 or removing the selected object from the plate 10. The studs may be countersunk through the base plate and welded in place. The important feature is that the studs are fixedly attached to the plate that they cannot move independently of the plate. The selected object may be a tripod head, a camera or any component attached to the base plate via the threaded bolts 110, 112. Black anodizing of the plate is used to provide a scratch resistant surface and for aesthetics. The process requires the insertion and welding of the studs to be done prior to anodizing.

The combination of all these requirements and the realization that stainless steel studs could not undergo an anodizing process necessitated a search for a nonferrous metal. Although considerably more expensive, titanium was found to be a useful compound due to its high tensile strength and compatibility with aluminum anodizing solutions. Therefore the studs used to practice the invention may be or titanium or any non-ferrous metal having similar characteristics to titanium.

Figure 15:
FIG. 15 is an isometric top view of a base plate embodying the invention showing the studs, leveling holes and securing holes.

As shown in FIGS. 13 and 14, a base plate 10 embodying the invention was formed by drilling two holes 110a, 112a, into the aluminum plate to accommodate two titanium threaded studs 110 and 112. The studs which are T-shaped as diagrammed and slotted at the top to allow them to be locked in the welding process were placed into the two holes and countersunk as diagrammed. Subsequently, aluminum was used to weld the studs 110 and 112 in place. The back of the base plate 10 was then machined and polished to be absolutely flat and smooth. The entire assembly was then black anodized successfully. An isometric image of a plate embodying the invention is shown in FIG. 15.

There is no known base plate for a camera or a tripod mount constructed in this fashion. Known plates to be attached to a camera have stainless steel screws that are screwed in using either a coin or a screwdriver or an Allen wrench. This requirement is a disadvantage that makes the camera base mount embodying the invention unique.

Advantages of plates (bases) embodying the invention:
A plate embodying the invention takes up almost no space in a camera bag or in a user's pocket.
Since most professional camera/lens configurations are very front heavy, the offset of the screw-mount stud 110 towards the rear end 113 of the plate allows for maximum forward support.
The relatively thick lightweight metal (e.g., 3 mm thick aircraft grade aluminum) design allows for maximum rigidity and stability with minimum weight.
Three leveling screws (124) are included to allow the unit to stand firmly on significantly uneven surfaces.
No tools are required for any function of the unit.
The use of entirely rust free materials allows the plate to be completely washable with soap and water.
Additional thru holes (116) are formed in the plate to selectively secure the plate to a surface.

In summary, the camera mount base, as formed, enables the base plate 10 to be screwed (or unscrewed) into (or from) any camera or ancillary part by rotating the plate and/or the camera part without the need of any tool. This is very significant where a user needs or wants to set up a camera and there are no tool kits available.

What is claimed is:

1. A photographic system comprising:
   a piece of photographic equipment having a predetermined sized screw hole;
   a portable, generally rectangular, base plate being selectively attached to or detached from said photographic equipment for providing support and stability to said piece of equipment when attached thereto, said base plate formed of a non-ferrous, light and sturdy material, said base plate having a predetermined length, width and thickness and having a center line extending along the center of the plate for the length of the plate and having a midline running midway along the width of the plate; said base plate having a front end and a back end and a right side and a left side; and
   a non-ferrous threaded stud mounted along the center line and below the midline, closer to said back end than said front end; said stud being fixedly and permanently attached to the base plate; and the base plate and the stud being anodized; and said stud being sized to fit into said predetermined sized screw hole in said piece of equipment and the stud of the base plate being screwed into, or unscrewed from, said piece of photographic equipment without use of any external tools; and said base plate when attached to said piece of photographic equipment providing a base plate for supporting, leveling and stabilizing said piece of photographic equipment.

2. The apparatus as claimed in claim 1 wherein said base plate is formed of aluminum, wherein said stud is formed of titanium and wherein said stud is welded to the base plate.

3. The apparatus as claimed in claim 1 wherein said base plate includes three threaded leveling holes adapted to receive leveling screws for controlling the level of the base plate above an underlying surface, one leveling hole being formed along the center line close to the front end of the base plate and two leveling holes being formed near the back end of the base plate, one hole near the right side and the other hole near the left side of the plate; and at least two securing holes.

4. The apparatus as claimed in claim 1 wherein said non-ferrous threaded stud is made of titanium.

5. The apparatus as claimed in claim 1 further including a second non-ferrous threaded stud mounted along the center line above the midline; said second stud being welded in place and the second stud being anodized and sized to fit into a corresponding hole in said piece of equipment.

6. The apparatus as claimed in claim 1 further including three threaded leveling holes formed in the base plate, said leveling holes defining a triangular plane and threaded screws inserted in said leveling holes for leveling the base plate; one hole of the three leveling holes being formed along the center line close to the front end of the base plate and the other two of the three leveling holes being formed near the back end of the base plate, one hole near the right side and the other hole near the left side of the plate.

7. The apparatus as claimed in claim 1 further including three threaded leveling holes formed in the base plate and leveling screws inserted within the leveling holes of said base plate for controlling the leveling of the plate and for providing gripping to underlying surfaces.

8. The apparatus as claimed in claim 6 further including securing holes formed in said base plate for enabling the base plate to be attached to a desired surface.

9. Apparatus for mounting and providing a stable base to a piece of photographic equipment having a predetermined sized screw hole set by international photographic standards includes:
- a base plate formed of aluminum, said base plate having a predetermined length, width and thickness and having a center line extending along the center of the plate for the length of the plate and having a midline running midway along the width of the plate; said base plate having a front end and a back end and a right side and a left side; and
- a non-ferrous threaded stud mounted along the center line and below the midline, closer to said back end than said front end; said stud being fixedly and permanently attached to the base plate; and the base plate and the stud being anodized; and said stud being sized to fit into said predetermined sized screw hole in said piece of photographic equipment; and
- three threaded leveling holes formed in the base plate, said leveling holes defining a triangular plane and adapted to receive threaded screws inserted in said leveling holes for selectively raising or lowering and leveling the base plate relative to underlying surfaces; one leveling hole being formed along the center line close to the front end of the base plate and the other two leveling holes being formed near the back end of the base plate, one hole near the right side and the other hole near the left side of the plate.

10. The apparatus as claimed in claim 9 wherein said piece of photographic equipment is a camera mount.

11. The apparatus as claimed in claim 9 further including a second non-ferrous threaded stud positioned along said center line above said midline; said second nonferrous threaded stud being fixedly and permanently attached to the base plate and also being anodized.

12. The apparatus as claimed in claim 1 wherein said piece of photographic equipment is a tripod head.

13. The apparatus as claimed in claim 12 further including a camera mounted on said tripod head.

14. the apparatus as claimed in claim 13 wherein a portion of said camera is extendable beyond the front end of said base plate; the position of said stud compensating for the asymmetrical weight distribution due to the camera mounted on the plate and the position of said stud and underlying base plate keeping the camera stable and level.

15. The apparatus ass claimed in claim 10 wherein said camera mount is a tripod head and further including a camera mounted on said tripod head and wherein said camera is extendable beyond the front end of said base plate.

* * * * *